(12) United States Patent
Loucks

(10) Patent No.: US 6,542,790 B1
(45) Date of Patent: Apr. 1, 2003

(54) 3D NORMALIZED PROPORTIONAL REVERSE INTERPOLATION ERROR CORRECTION CONTROL

(75) Inventor: Charles Hamilton Loucks, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 503 days.

(21) Appl. No.: 09/607,699

(22) Filed: Jun. 30, 2000

(51) Int. Cl.[7] .............................................. G06F 19/00
(52) U.S. Cl. ........................... 700/282; 700/28; 700/46; 700/68; 700/189; 700/252; 700/281; 701/103; 701/104; 701/105; 701/56; 701/65
(58) Field of Search .................... 700/189, 252, 700/68, 67, 69, 71, 73, 74, 52–53, 281–282, 28–31, 34, 39–46, 37; 701/104, 103, 105, 56, 51, 59, 65

(56) References Cited

U.S. PATENT DOCUMENTS

| | | | | | |
|---|---|---|---|---|---|
| 4,720,791 A | * | 1/1988 | Daido | .......................... | 701/43 |
| 5,231,609 A | * | 7/1993 | Gaer | .......................... | 367/99 |
| 6,055,475 A | * | 4/2000 | Moriyama | .................... | 701/56 |
| 6,141,671 A | * | 10/2000 | Adams et al. | .............. | 708/313 |
| 6,445,823 B1 | * | 9/2002 | Liang | ......................... | 382/232 |
| 6,487,492 B1 | * | 11/2002 | Loucks | ....................... | 701/104 |

* cited by examiner

Primary Examiner—Ramesh Patel

(57) ABSTRACT

A method of distributing an error correction term over four grid points used in a normalized 3D lookup routine circulates a change in output of the normalized 3D lookup routine at a given position by a fixed error correction amount at a plurality of points related in proximity to an input value point. The magnitude of change for a given one of the plurality of break points is proportional to the slope change of the grid point from a read point. The proportional reverse interpolation process is particularly well adapted for use with a proportional-integral controller as may be used in the air/fuel ratio control system generating a fuel multiplier control signal in response to variations between an exhaust gas oxygen sensor signal and a command signal for the air/fuel ratio.

17 Claims, 1 Drawing Sheet

3D NORMALIZED PROPORTIONAL REVERSE INTERPOLATION ERROR CORRECTION CONTROL

TECHNICAL FIELD

The present invention relates to error correction feed back controls with a reverse interpolation of an identifiable correction to a plurality of proximate grid points based on a selectable time interval for correction as well as a number of iterations to be completed in the interval.

BACKGROUND ART

In many systems, such as an automobile engine fuel control system, the air/fuel ratio may be adjusted by a proportional-integral control loop that provides a fuel multiplier control signal to the engine. A combustion mixture or air/fuel ratio detector on the engine provides a signal to the control loop identifying whether the combustion has been completed as desired. The difference between the air/fuel ratio as designated and the effective combustion create an error signal introduced to the proportional-integral control loop. While such a system provides continuous adjustment, the loop does not provide a means to conform the correction to a desired objective, such as efficiency or power, under a wide variety of operating conditions that may be encountered by the engine, including the demand for power and the speed at which the engine is traveling.

Certain systems have been known to incorporate reverse interpolation algorithms for training a lookup table. While reverse interpolation changes a plurality of points in response to changes detected at a read point, such training may continue over prolonged periods or indefinitely without obtaining sufficient degrees of accuracy for a desired goal.

DISCLOSURE OF INVENTION

The present invention overcomes the above mentioned disadvantages by providing a method of reverse interpolation for training a 3D lookup table within a selected fixed time interval, and adjusting the difference between the desired goal and a current response at a plurality of grid points in relation to the slope with respect to a given read point. In the preferred embodiment, a normalized throttle position signal and a normalized speed signal are input along with an error signal to an adaptive algorithm performing the 3D reverse interpolation. As a result, the present invention provides an adjusted output for a lookup table that is trained within a limited period of time and with well calculated steps of adjustment that establishes substantially complete adjustment over the limited time.

BRIEF DESCRIPTION OF DRAWINGS

The present invention will be more clearly understood by reference to the following detailed description of a preferred embodiment when read in conjunction with the accompanying drawing, in which like reference characters refer to like parts throughout the views, and in which.

BEST MODE FOR CARRYING OUT THE INVENTION

Figure 1:
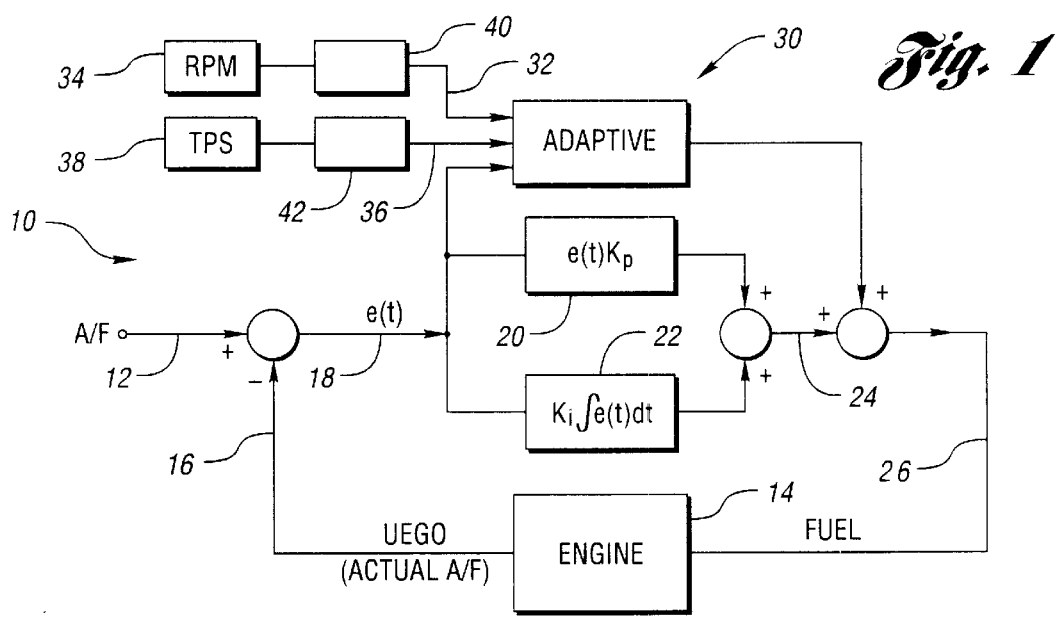
FIG. 1 is a schematic diagram of a combustion mixture control system for a motor vehicle that utilizes the reverse interpolation routine of the present invention.

Referring first to FIG. 1, a fuel control system 10 is shown comprising an air/fuel (A/F) ratio input 12 representing the ratio of the combustion mixture being fed to an engine 14. A sensor for determining the degree of combustion, for example, signal 16 from a universal exhaust gas oxygen sensor, indicates the degree of combustion by the amount of oxygen contained in the exhaust gas. A different signal 18 is input to a standard proportional-integral control loop having a proportional algorithm 20 as well as an integral algorithm 22. The resulting signal from each of the processes 20 and 22 are summed to produce a result 24 needed to control the level of a fuel multiplier control signal 26 delivered to the engine 14.

The error signal 18 is also input to a processor 30 running the adaptive reverse interpolation algorithm method according to the present invention. The process is responsive to an input 32 representing a normalized value of an engine speed sensor, such as an rpm sensor 34. A second input 36 represents normalized value of a demand signal such as the output from a throttle position sensor 38. Normalization occurs at circuits 40 and 42, respectively.

Figure 2:
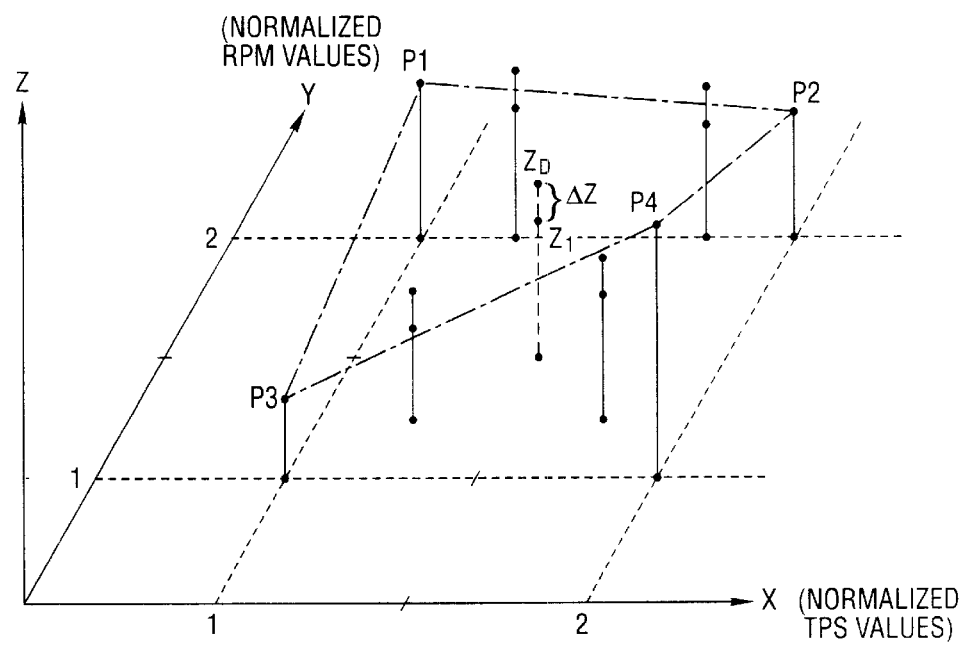
FIG. 2 is a diagrammatic illustration of three dimensional goods showing adjustment of a lookup table at a plurality of breakpoints according to the present invention.
Figure 3:
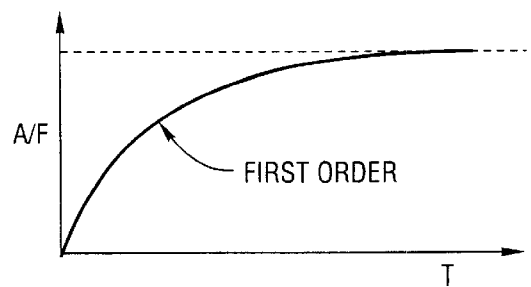
FIG. 3 is an average rate of change preferred for the reverse interpolation process according to the present invention.

Referring now to FIG. 2, an air/fuel ratio represented along the Z axis is driven by X axis input from the throttle position sensor 38 data and Y axis input values generated from the speed sensor 34. As the error signal 18 shows a discrepancy between a set air/fuel ratio Z(D) and a realized air/fuel ratio Z(1), an adjustment $\Delta z$ is reverse interpolated to the points P1, P2, P3, and P4 over a fixed time at interval and in a fixed number of steps, whereby each value P along the Z axis is modified to provide a limited number of iterations to complete the adjustment. Preferably, changes in the set air/fuel ratio value Z(D) are reached over the limited time interval in a manner of a first order (substantially exponentially) degradation as shown in FIG. 3, whereby large changes in the value of the air/fuel ratio occur early in the interval.

A more detailed description of the process is provided below.

$z=F(x,y,P1,P2,P3,P4)$      1)

$z=F(x,y,P1,P2,P3,P4)=P1*m1+P2*m2+P3*m3+P4*m4$, where      2)

$m1=(1-xr-yr+(xr)*(yr))$      a)

$m2=(xr-(xr)*(yr))$      b)

$m3=(yr-(xr)*(yr))$      c)

$m4=(xr)*(yr)$      d)

$xr=x-\text{trunc}(x)\{\text{trunc}(x)=\text{zero fractional part of } x.\}$      e)

$yr=y-\text{trunc}(y)$      f)

The problem or objective is twofold: a) to adjust breakpoints P1–P4 such that the z output changes by some fixed error amount at point x,y; and b) to distribute the error proportional to the slope change m1–m4 for the given breakpoint P1–P4. Notice, for example, when xr=0 & yr=0 that m1=1, m2=0, m3=0 & m4=0 meaning that all of the error is distributed at breakpoint P1. Also, when xr=0.5 & yr=0.5, then m1=0.25, m2=0.25, m3=0.25 & m4=0.25, meaning that all breakpoints move an equal amount when x,y is equal distant from breakpoints P1, P2, P3 & P4.

Now, consistent with objective b) above, suppose the changes to the breakpoints P1–P4 are:

delta_P1=error*m1, delta_P2=error*m2, delta_P3=error*m3 and delta_P4=error*m4, then $$z' = [(P1 + \text{delta\_P1}) * m1] + \\ [(P2 + \text{delta\_P2}) * m2] + \\ [(P3 + \text{delta\_P3}) * m3] + \\ [(P4 + \text{delta\_P4}) * m4] \\ = [(P1 + error * m1) * m1] + \\ [(P2 + error * m2) * m2] + \\ [(P3 + error * m3) * m3] + \\ [(P4 + error * m4) * m4] \quad 3)$$

A change of z or delta_z=z'−z results in:

$$\text{delta\_z} = [(P1 + error * m1) - P1 * m1] + \\ [(P2 + error * m2) - P2 * m2] + \\ [(P3 + error * m3) - P3 * m3] + \\ [(P4 + error * m4) - P4 * m4] \\ = error * (sqr(m1) + sqr(m2) + sqr(m3) + \\ sqr(m4)), \\ \text{where } sqr(A) = A * A. \quad 4)$$

The trouble with the above delta_z equation is that objective a) above, or delta_z=error only when (sqr(m1)+sqr(m2)+sqr(m3)+sqr (m4)) equals unity, which is only the case when x,y are on one of the four breakpoints P1–P4. However, suppose again that a correction factor k is applied to each P1–P4 adjustment. Then, $$\text{delta\_z} = [(P1 + k * error * m1) * m1 - P1 * m1] + \\ [(P2 + k * error * m2) * m2 - P2 * m2] + \\ [(P3 + k * error * m3) * m3 - P1 * m3] + \\ [(P4 + k * error * m1) * m4 - P4 * m4] \\ = k * error * (sqr(m1) + sqr(m1) + sqr(m2) + \\ sqr(m3) + sqr(m4)) \quad 5)$$

Now, let delta_z=error, then $$1.0 = k*(sqr(m1)+sqr(m2)+sqr(m3)+sqr(m4)) \quad 6)$$

Hence, $$k=1.0/(sqr(m1)+sqr(m2)+sqr(m3)+sqr(m4)) \quad 6)$$

$$\text{delta\_}P1 = k*error*m1 \quad 7)$$

$$\text{delta\_}P2 = k*error*m2 \quad 8)$$

$$\text{delta\_}P3 = k*error*m3 \quad 9)$$

$$\text{delta\_}P4 = k*error*m4 \quad 10)$$

and $$z+error=F(x,y,P1+\text{delta\_}P1,P2+\text{delta\_}P2, P3+\text{delta\_}P3,P4+\text{delta\_}P4) \quad 11)$$

Since the norm_rev_interp_3d function is intended for use with various adaptive convergence schemes, the issue of determining how many learning iterations are required to get within a reasonable distance from a target value arises. Since breakpoints P1–P4 are adjusted such that the output is changed by an amount equal to the specified error amount at any arbitrary point x,y within the table, the learning trajectory shall approximate a first order lag filter assuming: a) The error is calculated as a constant fraction of the difference between the target value and the current value of the 3D interpolated output; b) the point x,y is held constant during the learning period in question; and c) the four breakpoints which make up a cell all need to move in the same direction to reduce the error amount. This learning equation as to how long the learning period must be is:

$$A[n+1]=A[n]+(D-A[n])*r \text{ where} \quad 12)$$

a) A[n]=3D interpolated output value at nth iteration
b) D=some arbitrary constant desired value
c) r=constant positive fraction learn rate Expanding out equation 12) above and simplifying yields:

$$A[n]=D-(D-A[0])*[(1-r)^{**}n] \text{ where} \quad 13)$$

a) A[0]=initial 3D interpolated output value
b) (1−r)**n=the quantity (1−r) raised to the nth power Now, let one time constant T represent n iterations when n is large and n*r=1.0. Applying equation 13) above and solving for (D−A[n])/(D−A[0]) yields:

$$(D-A[n])/(D-A[0])=(1-r)^{**}n=\text{fraction remaining} \quad 14)$$

Equation 14) above shows the fraction of the distance D−A[0] remaining after n iterations starting from initial value A[0]. The following table approximates what values for "fraction remaining" exists for the given time constants shown assuming r=0.001:

| 15) | T | fraction remaining |
|---|---|---|
| | 1.0 | 0.3677 |
| | 2.0 | 0.1352 |
| | 3.0 | 0.0497 |
| | 4.0 | 0.0183 |
| | 5.0 | 0.0067 |

Table 15) above shows that five time constants are required to get within one percent of the target value.

However, the presumption that the point x,y shall remain constant is not realistic. A more realistic assumption is that x,y shall move around in a given cell randomly. Reproducing table 15) above but with the more realistic assumption that x,y shall move around randomly within the same cell produces the following result r=0.001):

| 16) | T | fraction remaining |
|---|---|---|
| | 1.0 | 0.5401 |
| | 2.0 | 0.2845 |
| | 3.0 | 0.1597 |
| | 4.0 | 0.0796 |
| | 5.0 | 0.0413 |

After five time constants, the more realistic result shown in table 16) is about 3.5% away from the idealized result shown in table 15). The most likely explanation for the above discrepancy between table 15) and table 16) is that presumption c) above is violated when the actual value gets close to the target value. Presumption c) is much more likely to apply in the case when the adapt table is initialized and less likely as to apply as individual cells approach their steady state points. However, for most applications, it is probably safe to assume that equation 13) above, assuming idealized conditions, is good enough when five or more time constants are used and the starting point is from a fresh initialization.

Another fact to keep in mind is that a single breakpoint, which is not on an edge or corner of the table, is updated whenever point x,y is in a cell adjacent to the breakpoint. For breakpoints not on an edge or corner, there are four adjacent cells. For breakpoints on an edge but not at a corner, there are two adjacent cells; and finally, for breakpoints on a corner, there is only the cell itself. The practical effect of this is that breakpoints at an edge or corner learn more slowly than breakpoints not on an edge or corner, assuming the learn rate is the same for all breakpoints.

A first method embodiment is demonstrated by a program F32 norm_rev_interp_3d(RINTERP_3D *Table_ptr, F32 Norm_x, F32 Norm_y, F32 Error)

```
{
F32 k;                  k-correction
F32 error_prime;        error with k-correction applied
F32 whole;              Floating pt whole part of one of
                        the normalized inputs
int x1, x2;             X integral indexes into table
int y1, y2;             Y integral indexes into table
F32 xr;                 Fractional part of Norm_x applied
                        during interpolation
F32 yr;                 Fractional part of Norm_y applied
                        during interpolation
F32 xyr;                xr * yr
F32 P1;                 Contents of array [x1] [y1]
F32 m1;                 P1 multiplier
F32 P2;                 Contents of array [x2] [y1]
F32 m2;                 P2 multiplier
F32 P3;                 Contents of array [x1] [y2]
F32 m3;                 P3 multiplier
F32 P4;                 Contents of array [x2] [y2]
F32 m4;                 P4 multiplier
F32 z;                  results of four points interpolation
int tabl_x_size;        Size of table in the X direction
int tabl_y_size;        Size of table in the X direction
F32 *array;             Pointer to the table
                        Unpack input structure
                        table_x_size = Table_ptr->x_size
                        table_y_size + Table_ptr->y_size;
                        array = Table_ptr->array ptr;
```

The four indexes that define the four points to interpolate about are identified. These are clipped to the beginning and end of the table. Finally, the fractional part of the normalized inputs are used as the ratio in the interpolation. If any of the indexes are clipped, in order to fit with the table, the ratio will be set to 0 and the second index will be set to the same value as the first, thereby removing the second point of the pair from the interpolation.

First, in the X Direction:
x1=(int)Norm_x;
whole=(F32)x1;
x2=X1+1;
xr=Norm_x-whole;
To insure the indexes are positive, we analyze if (Norm_x<0)
x1=0
x2=0;
xr=0.0F;
Make sure indexes are within the Table else if (x2>=table_x_size)
x1=table_x_size -1;
x2=x1;
xr=0.0F;
In the Y Direction:
y1=(int)Norm_y;
whole=(F32)y1;
y2=y1+1;
yr=Norm_y-whole;
Make sure indexes are positive
if (Norm_y<0)
y1=0;
y2=0;
yr=0.0F;
Make sure indexes Within the Table else if (y2>=table_y_size)
y1=table_y_size-1;
y2=y1;
yr=0.0F;
Adjust the Y indexes to access this 2d array as if it were a 1d array.
y1*=table_x_size;
y2*=table_x_size;
Now fetch the four points and do the interpolation.
P1=array[x1+y1];
P2=array[x2+y1];
P3=array[x1+y2];
P4=array[x2+y2];
xyr=xr*yr;

$$m1=(1.0F-xr-yr+xyr);$$

$$m2=(xr-xyr);$$

$$m3=(yr-xyr);$$

$$m4=(xyr);$$

$$k=1.0F/((m1*m1)+(m2*m2)+(m3*m3)+(m4*m4))$$

$$z=(P1*m1)+(P2*m2)+(P3*m3)+(P4*m4);$$

error_prime=Error*k;
Now reverse interpolate the four points.

$$array[x1+y1]=P1+(m1*error\_prime);$$

if (x1!=x2)

$$array[x2+y1]=P2+(m2*error\_prime);$$

if (y1!=y2)

$$array[x1+y2]=P3+(m3*error\_prime);$$

if(x1!=x2)

$$array[x2+y2]=P4+(m4*error\_prime);$$

return(z);

Another routine does the same thing as above but it also checks the values placed back into the RAM lookup table to see if any exceed the min and max values passed to the routine. If any breakpoints do exceed the limits, the Stat flag returns TRUE and the appropriate breakpoint(s) is/are set to either the min or max as required.

The second method embodiment is demonstrated by a program

FUNCTION : F32 norm_rev_interp_3d_clip
(RINTERP_3D * Table_ptr,
F32 Norm_x,

-continued

```
                    F32 Norm_y,
                    F32 Error
                    F32 Min,
                    F32 Max,
                    FLAG *Stat)
INPUT PARAMETERS:
Table_ptr -     A structure pointer of type RINTERP_3D.
Norm_x -        A normalized X index into the table.
Norm_y -        A normalized Y index into the table.
Error -         A correction amount distributed over
                points P1, P2, P3 & P4
Min -           A minimum clip value for P1, P2, P3 & P4
Max -           A maximum clip value for P1, P2, P3 & P4
Stat -          A status flag; TRUE = P1|P2|P3|P4
                under/over Min/Max otherwise FALSE
RETURN VALUES:
F32 -           The table value corresponding to
                table_ptr[x] [y] prior to modification
                of points P1, P2, P3 & P4.
P1, P2, P3 & P4 - new four points to be used in the
                interpolation
FLAG pointer -  Pointer to Stat status information
F32 norm_rev_interp_3d_clip(RINTERP_3D *Table_ptr,
                    F32 Norm_x,
                    F32 Norm_y,
                    F32 Error,
                    F32 Min,
                    F 32 Max,
                    FLAG *Stat)
F32 k;          k-correction
F32 error_prime; error with k-correction applied
F32 whole;      Floating pt whole part of one of
                the normalized inputs
int x1, x2;     X integral indexes into table
int y1, y2;     Y integral indexes into table
F32 xr;         Fractional part of Norm_x applied
                during interpolation
F32 yr;         Fractional part of Norm_y applied
                during interpolation
F32 xyr;        xr * yr
F32 P1;         Contents of array[x1] [y1]
F32 m1;         P1 multiplier
F32 P2;         Contents of array[x2] [y1]
F32 m2;         P2 multiplier
F32 P3;         Contents of array[x1] [y2]
F32 m3;         P3 multiplier
F32 P4;         Contents of array[x2] [y2]
F32 m4;         P4 multiplier
F32 new_pt;     new point value
F32 z;          result of four point interpolation
U8 status;      clip reached flag
int table_x_size; Size of table in the X direction
int table_y_size; Size of table in the X direction
F32* array;     Pointer to the table
```

Unpack input structure
   table_x_size=Table_ptr->x_size;
   table_y_size=Table_ptr->y_size;
   array=Table_ptr->array_ptr;
The four indexes that define the four points to interpolate about are identified. These are clipped to the beginning and end of the table. The fractional part of the normalized inputs are used as the ratio in the interpolation. If any of the indexes are clipped, in order to fit with the table, the ratio will be set to 0 and the second index will be set to the same value as the first, thereby removing the second point of the pair from the interpolation.
   First the X Direction:
   x1=(int)Norm_x;
   whole=(F32)x1;
   x2=x1+1;
   xr=Norm_x-whole;
   To insure the indexes are positive, analyze
   if (Norm_x<0)
      x1=0;
      x2=0;
      xr=0.0F;
   Make sure indexes are within the Table
   else if (x2>=table_x_size)
      x1=table_x_size-1;
      x2=x1;
      xr=0.0F;
   In the Y Direction:
   y1=(int)Norm_y;
   whole=(F32)y1;
   y2=y1+1;
   yr=Norm_y-whole;
   Make sure indexes are positive
   if (Norm_y<0)
      y1=0;
      y2=0;
      yr=0.0F;
   Make sure indexes Within the Table
   else if (y2>+table_y_size)
      y1=table_y_size-1;
      y2=y1;
      yr=0.0F;
   Adjust the Y indexes to access this 2d array as if it were a 1d array.
   y1*=table_x_size;
   y2*=table_x_size;
Now fetch the four points and do the interpolation.
   P1=array[x1+y1];
   P2=array[x2+y1];
   P3=array[x1+y2];
   P4=array[x2+y2];

$$xyr = xr*yr;$$

$$m1 = (1.0F - xr - yr + xyr);$$

$$m2 = (xr - xyr);$$

$$m3 = (yr - xyr);$$

$$m4 = (xyr);$$

$$k = 1.0F/((m1*m1) + (m2*m2) + (m3*m3) + (m4*m4));$$

$$z = (P1*m1) + (P2*m2) + (P3*m3) + (P4*m4);$$

error_prime=Error*k;
Now reverse interpolate the four points.
   status=FALSE;

new_pt=(P1+(m1*error_prime));

if (new_pt>=Max)
      status=TRUE;
      new_pt=Max;
   else if (new_pt<=Min)
      status=TRUE;
      new_pt=Min;
   array[x1+y1]=new_pt;
   if(x1!=x2)
      new_pt=(P2+(m2*error_prime));
      if(new_pt>=Max)

```
status=TRUE;
   new_pt=Max;
else if(new_pt<=Min)
status=TRUE;
   new_pt=Min;
array[x2+y1]=new_pt;
if(y1!=Y2)
new_pt=(P3+(m3*error_prime));
if(new_pt>=Max)
status=TRUE;
   new_pt=Max;
else if (new_pt<=Min)
status=TRUE;
   new_pt=Min;
array[x1+y2]=new_pt;
if (x1!=x2)
   new_pt=(P4+(m4*error_prime));
if(new_pt>=Max)
status=TRUE;
   new_pt=Max;
else if(new_pt<=Min)
status=TRUE;
   new_pt=Min;
array[x2+y2]=new_pt;
Stat=status;
return(z);
```

Another routine is intended to address the problem of cells learning their respective steady state points in different time periods. This routine forces all cells that are visited a reasonable number of times to learn their respective steady state values in the same time interval. This objective is accomplished by counting the number of times each breakpoint is updated and adjusting the learn rate using the update count. The learning time interval is specified as the time constant described above in the section Adaptive Convergence Timing at pages 6 and 9 above.

The third method embodiment is demonstrated by a program

```
FUNCTION :   F32 norm_rev_interp_3d_period
             (RINTRP_PERIOD_ *Table_ptr,
             3D
                           F32 Norm_x,
                           F32 Norm_y,
                           F32 Min_Rate,
                           F32 Max_Rate,
                           F32 Period,
                           F32 TA,
                           F32 Min_Clip,
                           F32 Max_Clip,
INPUT PARAMETERS:
             FLAG *Stat)
Table_ptr -     A structure pointer of type
                RINTRP_PERIOD_3D.
Norm_x -        A normalized X index into the table.
Norm_y -        A normalized Y index into the table.
Min_Rate -      Minimum value for 1/Period*Hertz.
Max_Rate -      Maximum value for 1/Period*Hertz.
Period -        One time constant in seconds.
TA -            Target minus Actual amount.
Min_Clip -      Minimum clip value for P1, P2, P3 & P4.
Max_Clip -      Maximum clip value for P1, P2, P3 & P4.
Stat -          A status flag: TRUE = P1|P2|P3|P4
                under/over Min/Max otherwise FALSE
RETURN VALUES:
F32 -           The table value corresponding to
                table_ptr[x] [y] prior to modification
                of points P1, P2, P3 & P4
P1, P2, P3 & P4 - new four points to be used in the
                interpolation
```

```
                                   -continued
FLAG pointer -       Pointer to Stat status information
F32 norm_rev_interp_3d_period(RINTRP_PERIOD_3D
                     *Table_ptr
                     F32   Norm_x,
                              F32   Norm_y,
                     F32   Min_Rate,
                     F32   Max_Rate,
                     F32   Period,
                              F32   TA,
                              F32   Min_Clip,
F32 k;               k-correction
F32 error_prime;     error with k-correction applied
F32 delta_p;         Delta P1-P4 correction amount
F32 whole;           Floating pt whole part of one of
                     the normalized inputs
int x1, x2;          X integral indexes into table
int y1, y2;          Y integral indexes into table
int sumxy            Array x+y sum
F32 xr;              Fractional part of Norm_x applied
                     during interpolation
F32 yr;              Fractional part of Norm_y applied
                     during interpolation
F32 inp;             inverse of the number of periods
F32 xyr;             xr * yr
F32 P1;              Contents of array[xl] [yl]
F32 m1;              P1 multiplier
F32 P2;              Contents of array[x2] [yl]
F32 m2;              P2 multiplier
F32 P3;              Contents of array[xl] [y2]
F32 m3;              P3 multiplier
F32 P4;              contents of array[x2] [y2]
F32 m4;              P4 multiplier
F32 hz;              sample or iteration rate
F32 new_pt;          new point value
U8 status;           clip reached flag
F32 z                result of four point interpolation
int table_x_size;    Size of table in the X direction
int table_y_size     Size of table in the X direction
F32*array;           Pointer to the table
U32 *lrn_freez_ptr;  Pointer to learn freeze count
U8 *b_cnt;           Breakpoint count
     Unpack input structure
     table_x_size   =   Table_ptr->x_size;
     table_y_size   =   Table_ptr->y_size;
     lrn_freez_ptr  =   Table_ptr->lrn_freez_ptr;
     hz             =   Table_ptr->hz;
     array          =   Table_ptr->array_ptr;
     b_cnt          =   Table_ptr->b_cnt_ptr;
```

Identify the four indexes which define the four points to interpolate about. Clip these to the beginning and end of the table. Also take the fractional part of the normalized inputs to be used as the ratio in the interpolation. If any of the indexes are clipped, in order to fit with the table, the ratio will be set to 0 and the second index will be set to the same value as the first, thus removing the second point of the pair from the interpolation.

First in the X Direction:

```
x1=(int)Norm_x
whole=(F32)x1;
x2=x1+1;
xr=Norm_x-whole;
Make sure indexes are positive
if (Norm_x<0)
   x1=0;
   x2=0;
   xr=0.0F;
Make sure indexes Within the Table
else if (x2>=table_x_size)
   x1=table_x_size-1;
   x2=x1;
   xr=0.0F;
```

In the Y Direction:
y1=(int)Norm_y;
whole=(F32)y1;
y2=y1+1;
yr=Norm_y-whole;
Make sure indexes are positive
if (Norm y<0)
  y1=0;
  y2=0;
  yr=0.0F;
Make sure indexes are within the Table
else if (y2>=table_y_size)
  y1=table_y_size-1;
  y2=y1;
  yr=0.0F;
Adjust the Y indexes to access this 2d array as if it were a 1d array.
  y1*=table_x_size;
  y2*=table_x_size;
Now fetch the four points and do the interpolation.
  P1=array[x1+y1];
  P2=array[x2+y1];
  P3=array[x1+y2];
  P4=array[x2+y2];

$xyr=xr*yr;$ $m1=(1.0F-xr-yr+xyr);$ $m2=(xr-xyr);$ $m3=(yr-xyr);$ $m4=(xyr);$ $z=(P1*m1)=(P2*m2)+(P3*m3)+(P4*m4);$ A learn freeze count is used to temporarily disable adaptive learning when a cell count reaches its upper limit. When the upper limit is reached, learning stops and all of the adapt cell count or b_cnt[ ] values and the cnt_div value are divided by two. Since this divide-by-two operation can place an infrequent but significant throughput load on the processor, the b_cnt_update_rate constant parameter specified in the RINTRP_PERIOD_3D struct is used to set an upper limit on the number of b_cnt[ ] cells divided by two per iteration. The divide by two operation is continued every successive iteration until all of the b_cnt[ ] cells are operated on. When the learn freeze count is zero, learning continues where it left off.

```
if(*lrn_freez_ptr == (U32)FALSE)
do cell adapt logic
    U8 counts;
    k = 1.0F/(m1*m1)+(m2*m2)+(m3*m3)+(m4*m4))
    error_prime = (TA)*k;
    inp = ((F32) (++(*Table_ptr->cnt_div)))/
        (Period*hz);
    ++(*Table_ptr->itr_cnt);
```

Now reverse interpolate the four points.
  sumxy=x1+y1;
  counts=++b_cnt[sumxy];
To calculate the rate for each change of P1, P2, P3 and P4 depending upon the number of hits at each point, a process may be programmed as follows:

```
delta_p =
    CLIP(Min_Rate, (inp/((F32) (counts))), Max_Rate);
if(b_cnt[sumxy] >=B_COUNT_LIMIT)
    *lrn_freez_ptr=(U32) (table_x_size*table_y_size);
status = FALSE;
new_pt = P1 + (m1*error_prime*delta_p);
    if(new_pt >= Max_Clip)
status = TRUE;
    new_pt = Max_Clip;
else if(new_pt <= Min_Clip)
status = TRUE;
    new_pt = Min_Clip;
array[sumxy] = new_pt; (update point P1)
if(x1 != x2)
    sumxy = x2+y1;
    counts = ++b_cnt [sumxy]
        delta_p = CLIP(Min_Rate, ((inp/(F32)
        (counts))), Max_Rate);
    if(b_cnt[sumxy] >=B_COUNT_LIMIT)
        *lrn_freez_ptr=(U32) (table_x_size*table_y_);
    new_pt = P2 + (m2*error_prime*delta_p);
    if(new_pt >= Max_Clip)
        status = TRUE;
        new_pt = Max_Clip;
else if(new_pt <= Min_Clip)
    status = TRUE;
    new_pt = Min Clip;
array[sumxy] = new pt; (update point P2)
if(y1 != y2)
    sumxy = x1+y2;
    counts = ++b_cnt[sumxy];
    delta_p = CLIP(Min_Rate, (inp/((F32)
        (counts))), Max_Rate);
    if(b_cnt[sumxy] >= B_COUNT_LIMIT)
        *lrn_freez_ptr=(U32)
        (table_x_size*table_y_size);
    new_pt = P3 + (m3*error_prime*delta_p)
    if (new_pt >= Max_Clip)
        status = TRUE;
        new_pt = Max_Clip;
    else if(new_pt <= Min-Clip)
        status = TRUE;
        new_pt = Min_Clip;
        array[sumxy] = new_pt; (update point P3)
else
        status = TRUE;
        new_pt = Min_Clip;
        array[sumxy] = new_pt; (update point P4)
else
    do divide-by-two operation
    U32 j;
    U32 counts = Table_ptr->b_cnt_update_rate;
    for (j=0; j<counts; j++)
        if(*lrn_freez_ptr != (U32)FALSE)
            U32 lrn_freez_cnt = --(*lrn_freez_ptr);
            b_cnt[lrn_freez_cnt]=(b_cnt[lrn_freez_
            cnt]>>1);
        else
            *Table_ptr->cnt_div=((*Table_ptr->cnt_
            div)>>1)
break;
```

Having thus described the present invention, many modifications will become apparent to those skilled in the art to which it pertains without departing from the scope and spirit of the present invention as defined in the appended claims.

What is claimed is:

1. A method for improving the combustion mixture under actual operating conditions for an engine having a fuel control system utilizing a proportional-integral control feedback for the vehicle engine, comprising sensing a speed parameter;

sensing a throttle demand parameter;

detecting a combustion mixture error value at a read point related to a plurality of grid points and;

adapting a 3D lookup table by reverse interpolation over a selected time interval of a combustion mixture value at each of said plurality of multiple grid points in response to said detecting an error signal and said speed and throttle demand parameters.

2. The method as described in claim 1 wherein said reverse interpolation provides an error correction value on each of said multiple grid points that is a fixed increment of the difference between an initial combustion mixture value and a calculated combustion mixture value.

3. The method as described in claim 1 wherein said fixed increment is a fraction of said difference.

4. The method as described in claim 1 wherein said interpolation provides an error correction value for said combustion mixture value at each of said plurality of grid points interpolated as a function of distance from said read point.

5. The method as described in claim 4 wherein said function comprises the slope from a grid point value to said read point value.

6. The method as described in claim 1 and further comprising:

proportioning said combustion mixture value at each of said plurality of grid points corresponding to its relative location to said read point.

7. The method as described in claim 1 wherein said adapting step comprises minimizing the difference between a desired grid and a current grid over a selectable time interval.

8. The method as described in claim 7 wherein said interval corresponds to a selected number of laps on a racing circuit.

9. The method as described in claim 7 wherein minimizing the difference comprises reducing a recognized difference in fixed increments.

10. The method as described in claim 9 wherein said fixed increments are a fraction of said recognized difference.

11. The method as described in claim 1 wherein said interval is selected to revise the error exponentially over said interval.

12. The method as described in claim 1 and further comprising limiting values of the grid points to a selected range.

13. The method as described in claim 1 and further comprising adjusting learn rate depending upon frequency of visits to said grid points.

14. A method of reverse interpolation for training a 3D normalized lookup table comprises:

inputting two parameters related to a table, inputting an error signal of a difference between a desired and a current response of a plurality of proximate grid points, selecting a fixed time interval for rendering the adaption of a substantially complete errorless value; and adjusting the differences between a desired response and a current response over said interval by a first order decay pattern.

15. The method as described in claim 14 wherein said interval is selected to revise the error exponentially over said interval.

16. The method as described in claim 14 and further comprising limiting values of the grid points to a selected range.

17. The method as described in claim 14 and further comprising adjusting learn rate depending upon frequency of visits to said grid points.

* * * * *